(12) United States Patent
Hashizume (10) Patent No.: US 8,259,371 B2
(45) Date of Patent: Sep. 4, 2012

(54) IMAGE READING APPARATUS, IMAGE READING METHOD, PROGRAM AND RECORDING MEDIUM FOR COLOR PROCESSING PARAMETER ADJUSTMENT USING A FIRST COLOR PROCESSING STEP ON AN IMAGE READ FROM A FRONT SIDE OF A DOCUMENT AND A SECOND COLOR PROCESSING STEP ON AN IMAGE READ FROM A BACK SIDE OF THE DOCUMENT

(75) Inventor: Asako Hashizume, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 855 days.

(21) Appl. No.: 12/335,451

(22) Filed: Dec. 15, 2008

(65) Prior Publication Data

US 2009/0161185 A1 Jun. 25, 2009

(30) Foreign Application Priority Data

Dec. 20, 2007 (JP) ................................ 2007-328731

(51) Int. Cl.
  *G03F 3/08* (2006.01)
  *G06K 9/00* (2006.01)
(52) U.S. Cl. ........................................ 358/518; 382/167
(58) Field of Classification Search .................. None
  See application file for complete search history.

(56) References Cited

U.S. PATENT DOCUMENTS

2004/0125392 A1* 7/2004 Ohmori .......................... 358/1.9
2009/0116083 A1* 5/2009 Yoshizawa ..................... 358/505

FOREIGN PATENT DOCUMENTS

JP  2003-032504 A  1/2003
JP  2005-244519 A  9/2005

* cited by examiner

*Primary Examiner* — Twyler Haskins
*Assistant Examiner* — Christopher D Wait
(74) *Attorney, Agent, or Firm* — Canon USA Inc. IP Division (57) ABSTRACT

There are provided a first color processing step of performing color processing on an image read from a front side of a document and a second color processing step of performing color processing on an image read from a back side of the document. A color of the image color-processed in the first color processing step is set as an initial target. A color processing parameter used in the second color processing step is adjusted such that a color of the image color-processed in the second color processing step matches the initial target. The color processing parameters used in the first and second color processing steps are adjusted in multiple steps such that both the color obtained by the parameter adjustment and the color of the image color-processed in the first color processing step become closer stepwise to the color of the image color-processed in the second color processing step.

11 Claims, 10 Drawing Sheets

IMAGE READING APPARATUS, IMAGE READING METHOD, PROGRAM AND RECORDING MEDIUM FOR COLOR PROCESSING PARAMETER ADJUSTMENT USING A FIRST COLOR PROCESSING STEP ON AN IMAGE READ FROM A FRONT SIDE OF A DOCUMENT AND A SECOND COLOR PROCESSING STEP ON AN IMAGE READ FROM A BACK SIDE OF THE DOCUMENT

BACKGROUND OF THE INVENTION

1. Field of the Invention

The present invention relates to an image reading apparatus and an image reading method for reading images on both sides of a document during a single conveyance of the document, and a recording medium recording a program for executing the image reading method.

2. Description of the Related Art

Examples of image reading apparatuses widely used and capable of electronically reading image information of a document include a copier, a facsimile, a multifunction copier having a facsimile function, and a scanner for reading images to be input to a computer. There are two types of image reading apparatuses: one is an apparatus in which a fixed document is read by moving a light source, while the other is an apparatus in which a moving document is read by a fixed light source. Examples of the latter include an apparatus in which a plurality of documents are automatically conveyed and continuously read, and an apparatus in which a double-sided document is internally reversed so that both sides of the document are automatically read without any manual intervention.

Here, a double-sided document means a document with image information (e.g., text, graphics) printed on both the front and back sides of the document.

Additionally, with recent development of compact high-performance devices, there has become available a double-side simultaneous image reading apparatus capable of simultaneously reading both sides of a document without reversing it. The double-side simultaneous image reading apparatus includes two reading devices for respective front and back sides of a document and is configured, for example, as illustrated in FIG. 1.

Figure 1:
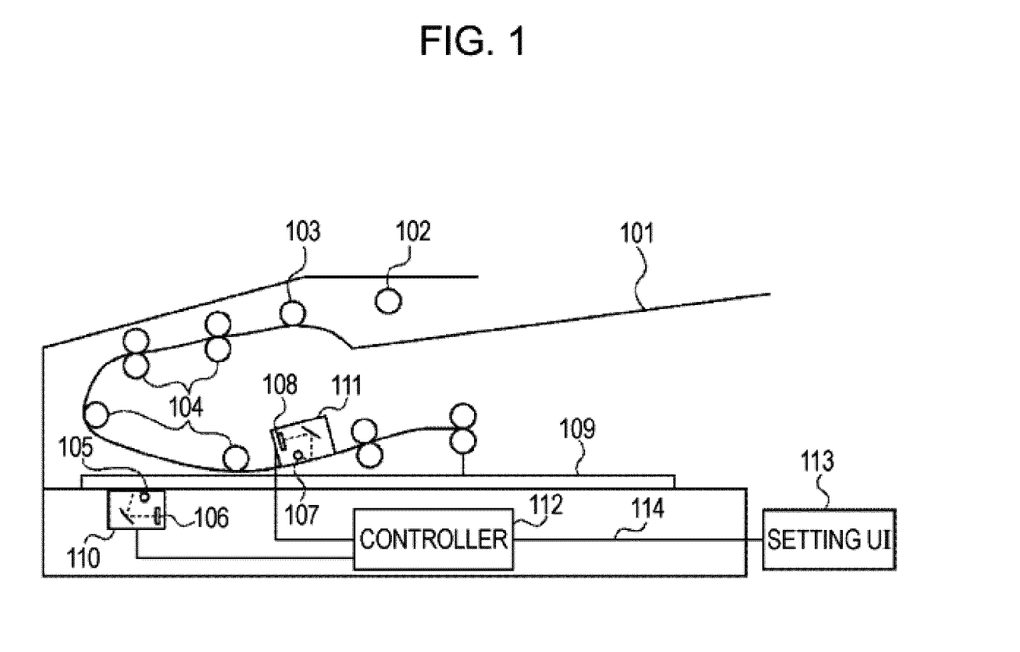
FIG. 1 illustrates a mechanical configuration of an image reading apparatus according to an exemplary embodiment of the present invention.

Referring to FIG. 1, the image reading apparatus includes a document plate 101, a pickup roller 102, a conveying roller 103, driven rollers 104, light sources 105 and 107, reading parts 106 and 108, and a glass table 109 serving as a document table. In the image reading apparatus, a first reading device 110 includes the light source 105 and the reading part 106, while a second reading device 111 includes the light source 107 and the reading part 108.

Double-sided documents loaded on the document plate 101 with their front sides facing up are fed one by one by the pickup roller 102 to a reading path. A picked-up document is conveyed by the conveying roller 103 through the driven rollers 104 to the interior of the apparatus. The reading part 106 is provided with the light source 105. The light source 105 has a spectral intensity in a wavelength range of visible light.

A document side (front side) of the document having reached a reading position of the first reading device 110 is irradiated by the light source 105. The light reflected off the document by the irradiation is incident on the reading part 106. Similarly, the opposite (or other) document side (back side) of the document having reached a reading position of the second reading device 111 is irradiated by the light source 107. The light reflected off the document by the irradiation is incident on the reading part 108.

The reading parts 106 and 108 each have at least a photoelectric conversion element that accumulates electric charge of an amount corresponding to the intensity of incident light. The accumulated electric charge is converted by an analog-to-digital (A/D) converter (not shown) from an analog signal to a digital signal. Thus, the image information on the document is converted to digital image data. The intensity of light incident on the reading parts 106 and 108 depends on the distribution of spectral reflectivity included in the information on the document.

As described above, the front side of the double-sided document conveyed to the reading position of the first reading device 110 is read by the light source 105 and the reading part 106, while the back side of the double-sided document conveyed to the reading position of the second reading device 111 is read by the light source 107 and the reading part 108. Here, the front side refers to a document side in a single-side reading mode, while the back side refers to a back side in a single-side reading mode.

Advantages of simultaneously reading image information on both sides of a double-sided document in the double-side simultaneous image reading apparatus described above are that no user intervention is necessary, the reading operation is quicker than in the case where the document is reversed, and the occurrence of jamming is reduced because only one document conveying path is provided.

At the same time, however, there are some disadvantages as follows. First, since reading devices for the front and back sides of the document are different, there are individual differences between the reading devices. The degree of degradation in durability after use for a certain period of time will also be different between the reading devices. Additionally, because of a difference in distance by which the document floats from the conveying path at the reading position, the modulation transfer functions (MTFs) of the reading devices are different. In other words, color and geometric characteristics of images read from both sides of the document may be different. Moreover, if the reading devices for the front and back sides are those having different configurations, such as a reduction optical system (charge-coupled device (CCD) sensor system) and an equal-magnification optical system (contact image sensor (CIS) system), differences in the above-described characteristics may become more evident.

If one image reading apparatus provides different reading characteristics for the front and back sides of a document, the user will inevitably mistrust the apparatus. Therefore, in an image reading apparatus capable of reading both sides of a document, it is at least necessary that reading characteristics for the front and back sides of the document match.

For example, Japanese Patent Laid-Open No. 2003-032504 proposes a calibration method to address the problems described above. In this method, the same reference pattern is read by a first reading unit and a second reading unit. Then, to reduce a difference between the output values of the first and second reading units, RGB-γ conversion tables for the first and second reading units are corrected.

In the method proposed in Japanese Patent Laid-Open No. 2003-032504, it is possible to match the reading characteristics of two different scanners. However, since a change in color before and after calibration is not taken into account, the reading characteristic may be changed significantly depending on the state of the scanner.

Japanese Patent Laid-Open No. 2005-244519 presents a proposal based on considerations for a change in color before and after calibration. That is, a calibration which involves control of the amount of correction is proposed. The proposal of Japanese Patent Laid-Open No. 2005-244519 discusses calibration in a single-side scanner and places its primary focus on reduction in operation time. A calibration apparatus proposed in Japanese Patent Laid-Open No. 2005-244519 includes a control unit which performs control to prevent a sudden change in color before and after correction. A correction chart is read by the scanner, colorimetric measurement is performed, and calibration is performed by using the colorimetric value as a target. If the amount of correction exceeds a predetermined value, the amount of correction is not added to the colorimetric value serving as a target. Then, correction is made only by an amount within a predetermined range. By performing control to reduce intervals between calibrations and repeating the above-described calibration many times, a calibration using the colorimetric value as a target can be eventually made. However, an ideal state cannot be approached without repeating the calibration itself many times. Therefore, if a device does not have an automatic colorimetric measurement unit, it is necessary to perform colorimetric measurement every time and thus to spend much effort.

The calibration presented in Japanese Patent Laid-Open No. 2005-244519 is based on colorimetric measurement. However, even when a colorimetric value is used as a target for calibration, there are still some problems to be solved. Since a reference level serving as a final target is gradually approached, it takes a long time to match the reading characteristics for the front and back sides after the start of initial calibration. While a color match is eventually achieved between the front and back sides, the user's demand may not be satisfied because, after calibration, the time during which the reading characteristics for the front and back sides do not match is too long.

The problems described above will be discussed in further detail with reference to FIG. 2A to FIG. 2C.

Figure 2A:
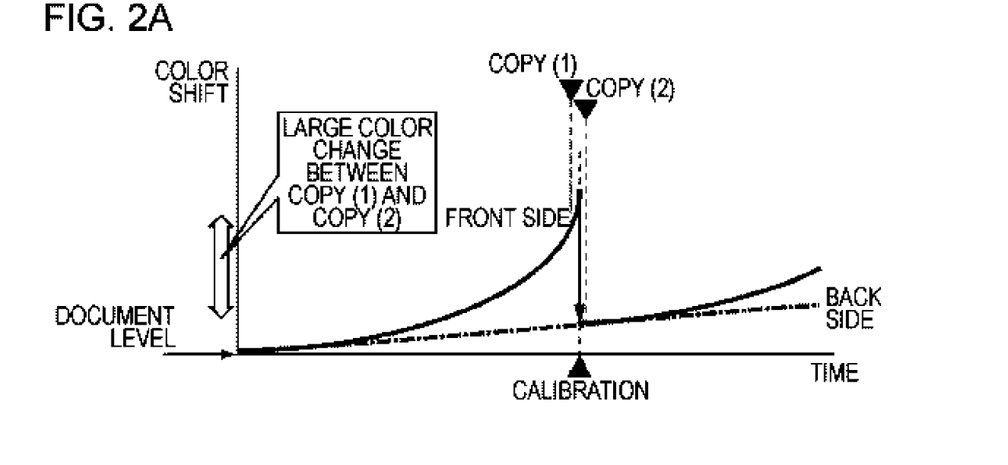
FIG. 2A to FIG. 2C illustrate calibration of a front-side reading device and a back-side reading device.
Figure 2B:
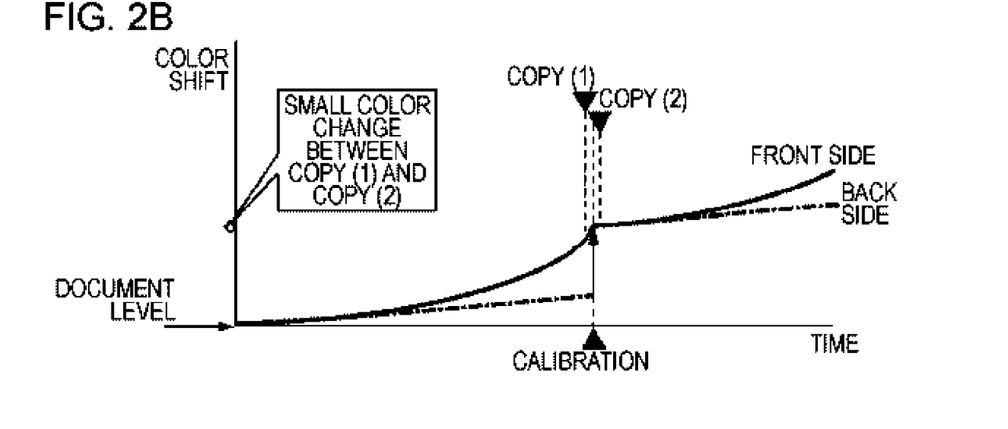
Figure 2C:
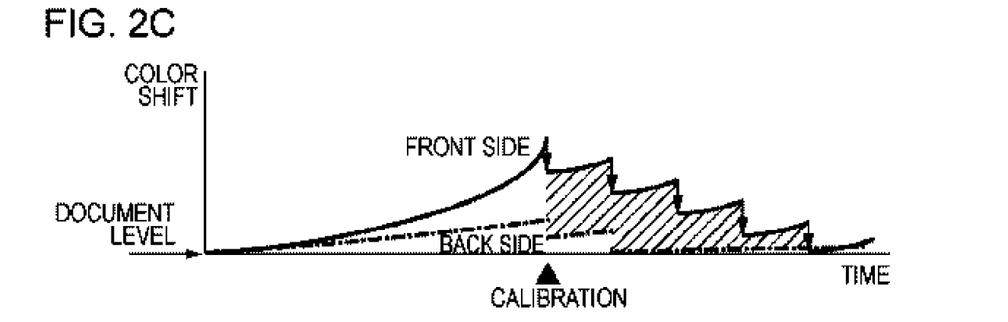

In FIG. 2A to FIG. 2C, the horizontal axis represents time, while the vertical axis represents the degree of color shift from a document level. A solid line indicates a reading characteristic of the first reading device 110 (hereinafter referred to as a front-side reading device), while an alternate long and short dashed line indicates a reading characteristic of the second reading device 111 (hereinafter referred to as a back-side reading device). Since the first reading device 110 is used in both single-side and double-side reading modes, the first reading device 110 may deteriorate more rapidly than the second reading device 111. However, this may not be applicable to a scanner with a different configuration or to a scanner in which the double-side reading mode is more frequently used.

FIG. 2A illustrates the case where calibration is performed with reference to the back-side reading device. The reading characteristic of the front-side reading device is greatly improved and can match that of the back-side reading device. However, there is a significant difference in color between a single-sided copy (1) made immediately before the calibration and a single-sided copy (2) made after the calibration.

FIG. 2B illustrates the case where calibration is performed with reference to the front-side reading device. The reading characteristic of the back-side reading device can match that of the front-side reading device. A difference in color between a single-sided copy (1) made immediately before the calibration and a single-sided copy (2) made after the calibration is reduced. However, as described above, since the front-side reading device is used in both the single-side and double-side reading modes, the front-side reading device is used more frequently than the back-side reading device. Therefore, durability of the front-side reading device deteriorates more rapidly than that of the back-side reading device. Making a correction with reference to the front-side reading device means that a reading device with a higher degree of color processing accuracy is adjusted to another reading device with a lower degree of color processing accuracy. In other words, a color shift from the document level is made larger (worse).

In the case of FIG. 2A, when a user who normally uses a single-side copying function makes a single-sided copy of a document that is the same as the one used several hours or several days ago, the resulting copy has a color different from that of the copy previously made. It is thus inevitable that the user will not be satisfied. In the case of FIG. 2B, a color match is achieved between the front-side reading device and the back-side reading device. However, their reading characteristics similarly deteriorate as described above. This deviates significantly from the original purpose of the calibration.

FIG. 2C illustrates a problem that arises when the technique of Japanese Patent Laid-Open No. 2005-244519 is applied to calibration between the front-side reading device and the back-side reading device. As illustrated, a difference in reading characteristic between the front-side reading device and the back-side reading device is only slightly reduced during calibration. It takes some time before the reading characteristic of the front-side reading device eventually matches that of the back-side reading device. In other words, even after calibration, a color shift remains large for a while, as indicated by a shaded area in FIG. 2C.

SUMMARY OF THE INVENTION

The present invention has been made in view of the problems described above. The present invention makes it possible to perform calibration in which a reading characteristic of a front-side reading device matches that of a back-side reading device. Additionally, the present invention provides calibration which improves consistency in single-side reading operations performed before and after the calibration. Moreover, the present invention makes it possible to bring colors of both sides eventually as close as possible to that of an original document. The present invention makes it possible to provide calibration which improves user satisfaction in single-side reading operations performed before and after the calibration.

According to an aspect of the present invention, an image reading apparatus for reading images on both sides of a document includes a first reading unit configured to read an image on a front side of the document; a second reading unit configured to read an image on a back side of the document; a first color processing unit configured to perform color processing on the image read by the first reading unit; a second color processing unit configured to perform color processing on the image read by the second reading unit; a storage unit configured to store a color of the image color-processed by the first color processing unit and a color of the image color-processed by the second color processing unit; a first color adjusting unit configured to set the color of the image color-processed by the first color processing unit as an initial target and adjust a color processing parameter used in the second color processing unit such that the color of the image color-processed by the second color processing unit becomes the same as the initial target; and a second color adjusting unit configured to adjust, in multiple steps, a color processing parameter used in the first color processing unit and the color processing parameter used in the second color processing unit such that both the color of the image color-processed by the first color processing unit and the color of the image color-adjusted by the first color adjusting unit become closer stepwise to the color stored in the storage unit and being the color of the image color-processed by the second color processing unit.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments of the invention and, together with the description, serve to explain the principles of the invention.

DESCRIPTION OF THE EXEMPLARY EMBODIMENTS

Image processing according to exemplary embodiments of the present invention will now be described in detail with reference to the drawings. For convenience, a double-side simultaneous image reading apparatus mounted on a copier will be described below. However, this image reading apparatus may be mounted on a facsimile or a scanner.

In a first exemplary embodiment, after the reading characteristics of a front-side reading device and a back-side reading device are matched in calibration, a stepwise correction is performed toward an ideal target. Thus, for a double-side reading mode, the reading characteristics of the front-side reading device and back-side reading device can be matched. For a single-side reading mode, after calibration which does not cause the user to notice significant changes in reading characteristic before and after the calibration, automatic correction can be performed toward an ideal target.

Here, an ideal target for use in matching the reading characteristics of the front-side reading device and back-side reading device is a reading characteristic of a less deteriorated device. The front-side reading device is used in both the single-side reading mode and double-side reading mode, while the back-side reading device is used only in the double-side reading mode. Therefore, the back-side reading device is generally less deteriorated than the front-side reading device. Thus, in the present exemplary embodiment, an ideal target refers to a reading characteristic of the back-side reading device. This is not applicable to cases where the back-side reading device deteriorates more rapidly.

As time passes or through repeated reading operations, the light quantity of a light source of a reading device changes. The changes in light quantity of the light source of the reading device deteriorate a reading characteristic of the reading device.

FIG. 1 illustrates a mechanical configuration of a double-side simultaneous image reading apparatus according to the present exemplary embodiment. A double-sided document is placed on the document plate 101 with its front side facing up. Thus, the front side of the double-sided document is read by the first reading device 110, while the back side of the double-sided document is read by the second reading device 111. Hereinafter, one side read by the first reading device 110 in the single-side reading mode is referred to as a front side, while the other side read by the second reading device 111 is referred to as a back side. The configuration of the double-side simultaneous image reading apparatus is not necessarily limited to that described above. For example, the first reading device 110 and the second reading device 111 may be an equal-magnification optical system (CIS system) and a reduction optical system (CCD sensor system), respectively. The number of sheet conveying paths and the number of driven rollers may be optional.

Figure 9:
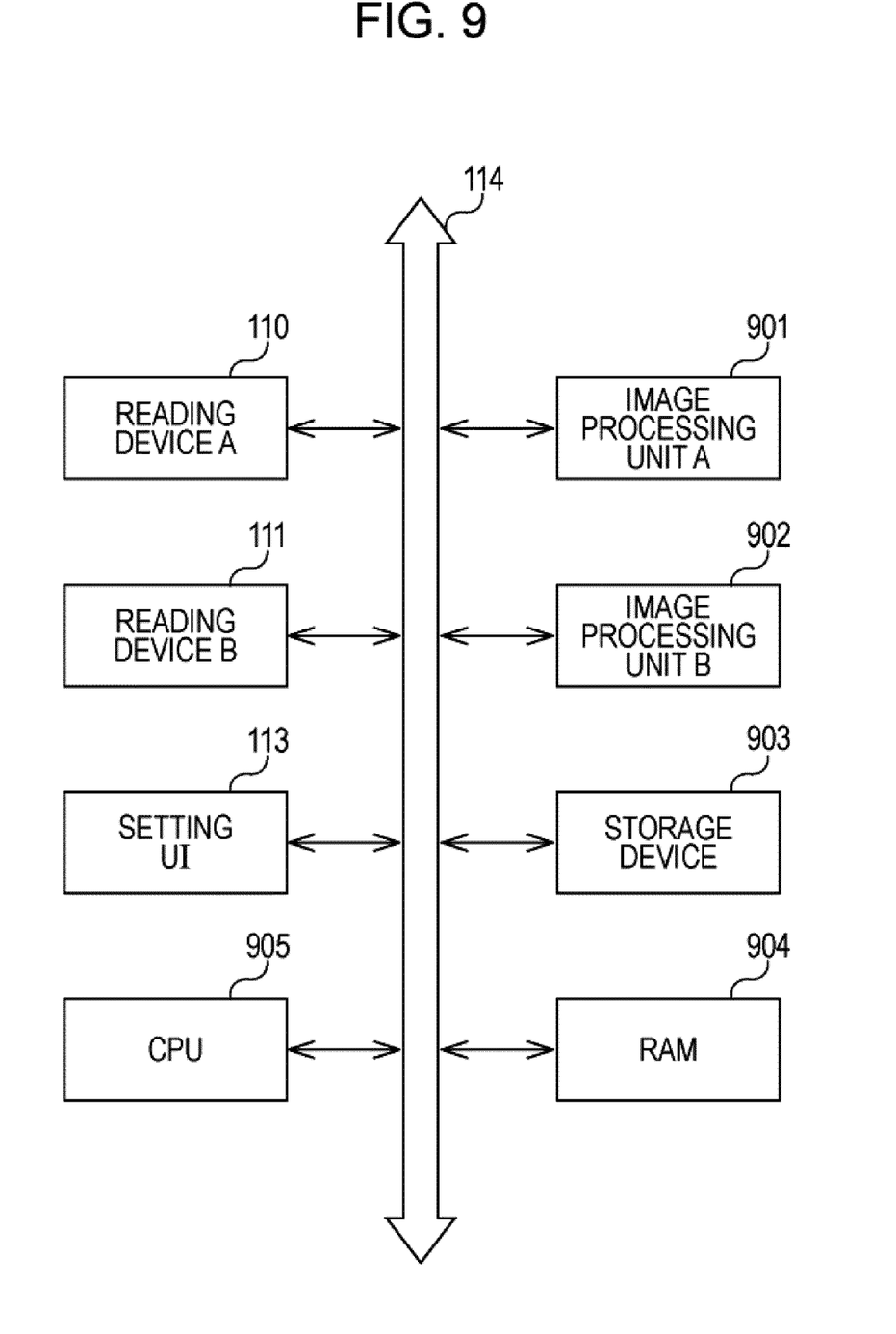
FIG. 9 is a block diagram illustrating an image reading apparatus according to an exemplary embodiment of the present invention.

FIG. 9 is a block diagram illustrating minimum necessary components of the double-side simultaneous image reading apparatus of FIG. 1.

The double-side simultaneous image reading apparatus of the present exemplary embodiment includes a reading device A 110 (first reading unit) capable of reading an image on the front side of a document and a reading device B 111 (second reading unit) capable of reading an image on the back side of the document. The double-side simultaneous image reading apparatus of the present exemplary embodiment further includes a setting user interface (UI) 113, an image processing unit A 901, and an image processing unit B 902. The setting UI 113 allows the user to input various settings. The image processing unit A 901 and the image processing unit B 902 receive read data through a bus 114 and perform image processing on the received data. The image processing unit A 901, the image processing unit B 902, a central processing unit (CPU) 905, a random-access memory (RAM) 904, and other chips necessary for image processing are mounted on a controller 112.

The double-side simultaneous image reading apparatus of the present exemplary embodiment further includes a storage device 903 in which parameters and operation programs for use in image processing are stored. The CPU 905 reads out and processes these parameters and operation programs by using the RAM 904. The above-described components of the double-side simultaneous image reading apparatus are connected to each other and perform data transmission through the bus 114. The configuration is not necessarily limited to this, and may further include other necessary components.

Figure 10:
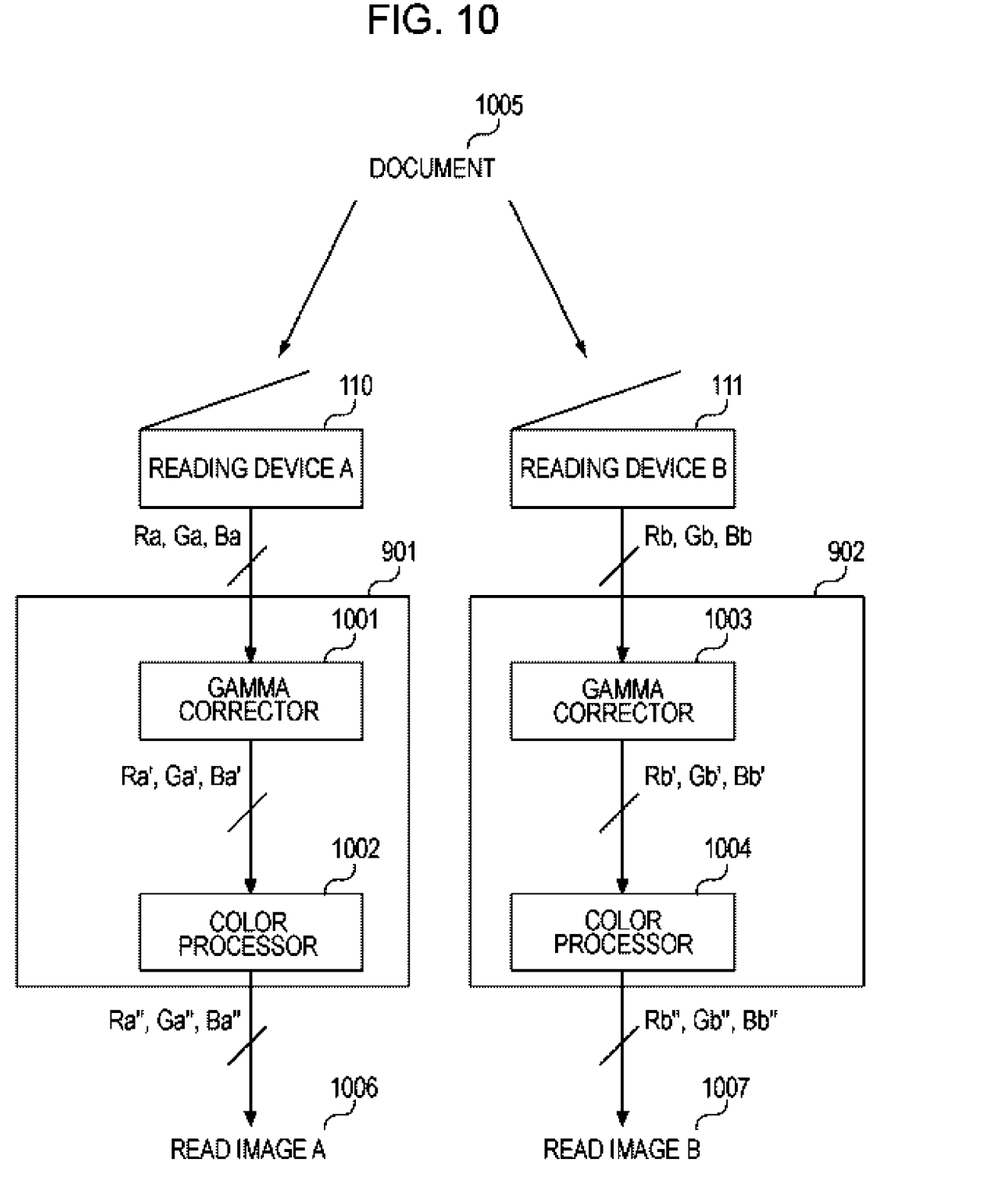
FIG. 10 illustrates image processing units according to an exemplary embodiment of the present invention.

FIG. 10 illustrates a main flow of color-related processing performed by the image processing unit A 901 and the image processing unit B 902. The reading device A 110 reads a document 1005 and generates signals Ra, Ga, and Ba. The signals Ra, Ga, and Ba have characteristics dependent on the reading device. The signals Ra, Ga, and Ba are transmitted to the image processing unit A 901, where a gamma corrector 1001 performs gamma correction on the signals Ra, Ga, and Ba to correct linearity of input-output characteristics generally possessed by the reading device. Image data Ra', Ga', and Ba' generated by the gamma correction is color space data still dependent on the characteristics of the reading device, and thus cannot be compared with data read by another reading device. The image data Ra', Ga', and Ba' is transmitted to and color-processed by a color processor (first color processing unit) 1002, and converted from the signals Ra', Ga', and Ba' in the color space dependent on the device characteristics to signals Ra", Ga", and Ba" in a color space independent of the device characteristics. Thus, a read image A 1006 is generated.

Similarly, image data read by the reading device B 111 is gamma-corrected by a gamma corrector 1003, color-processed by a color processor (second color processing unit) 1004, and converted to signals Rb", Gb", and Bb" independent of the device characteristics. Thus, a read image B 1007 is generated.

With the read image A 1006 and read image B 1007 generated through the processing described above, a comparison can be made between data read by the reading device A 110 and data read by the reading device B 111. In the present exemplary embodiment, an object to be corrected is a color processing table (color processing parameters) in the color processor 1002 and the color processor 1004. When the reading device A 110 and the reading device B 111 read the same color, even if Ra', Ga', and Ba' differ from Rb', Gb', and Bb', it is desirable that Ra", Ga", and Ba" be the same as Rb", Gb", and Bb". For this, the color processing table is corrected such that the outputs of the color processor 1002 and color processor 1004 become the same. After the processing performed by the color processor 1002 and the color processor 1004, color correction may further be performed depending on the configuration of the image processing unit. In this case, the color processing table is corrected from the one in a device-independent color space to the one in another device-independent color space.

The gamma corrector 1001 and the gamma corrector 1003 may either use the same color processing table or different color processing tables. Also, the color processor 1002 and the color processor 1004 may either use the same color processing table or different color processing tables. A three-dimensional lookup table (3D-LUT) or any other LUT suitable for the specifications or configuration of the reading device may be used in color processing. FIG. 10 illustrates minimum color-related processing performed by each image processing unit. Various types of further processing may be performed for correction of device characteristics.

Figure 3:
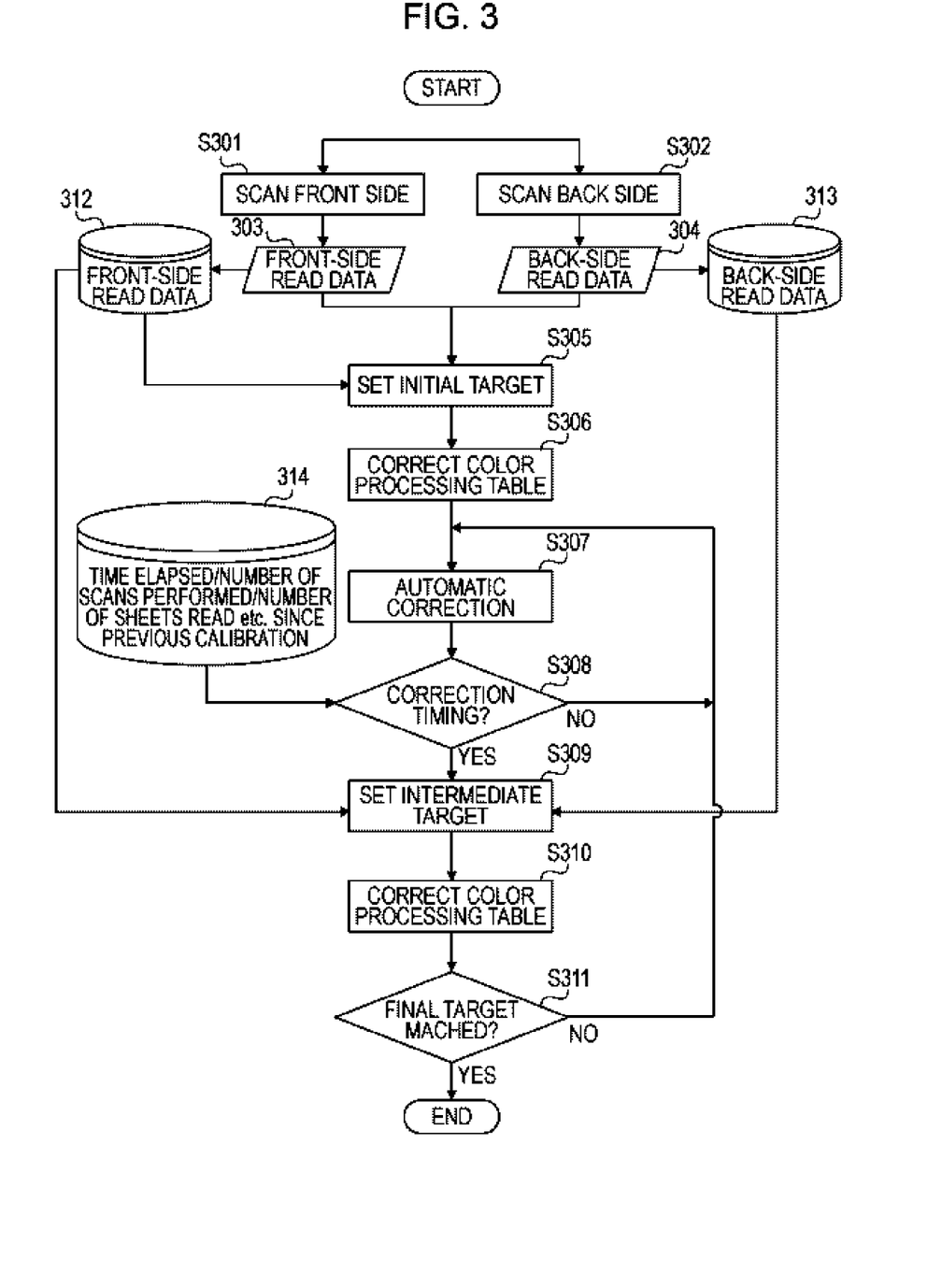
FIG. 3 is a flowchart illustrating a process of calibration according to an exemplary embodiment of the present invention.

FIG. 3 illustrates a processing flow of calibration based on a basic concept of the present exemplary embodiment. In this processing flow, there are provided an initial target, an intermediate target, and a final target. The intermediate target is automatically generated, updated, corrected, and brought closer to the final target. The calibration of the present exemplary embodiment is provided to match the reading characteristics of the front-side reading device and back-side reading device, prevent a sudden change in color in the single-side reading mode, and allow automatic stepwise adjustment to the final target.

Figure 4:
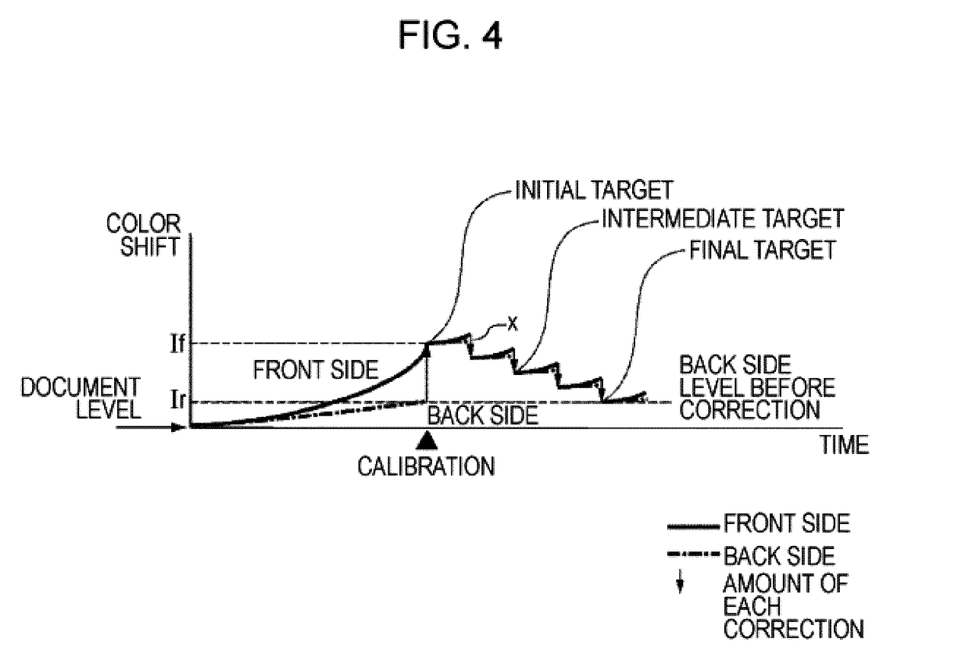
FIG. 4 illustrates a method of calibration of a front-side reading device and a back-side reading device according to an exemplary embodiment of the present invention.

On the basis of the above description, an overview of a calibration method will be described with reference to FIG. 4. FIG. 4 illustrates reading characteristics of the front-side reading device and back-side reading device. As illustrated, a calibration is performed when a color shift widens, that is, when a difference in reading characteristic between the front-side reading device and the back-side reading device widens (increases). First, a correction is performed by using a reading characteristic If as an initial target. The reading characteristic If is a reading characteristic of the front-side reading device at the beginning of the calibration. Thus, the reading characteristics of the front-side reading device and back-side reading device match. At the same time, since the reading characteristic of the front-side reading device remains unchanged, a sudden change in color before and after the correction in the single-side reading mode can be prevented. However, since the reading characteristic of the back-side reading device is adjusted to that of the front-side reading device, which is in a more deteriorated condition, the reading characteristic of the back-side reading device of higher accuracy will be deteriorated. Therefore, a reading characteristic Ir of the back-side reading device at the beginning of the calibration is set as a final target. Then, toward this final target, an intermediate target is set and automatic correction is performed, on the basis of the amount of correction x which does not make the user feel uncomfortable. The automatic correction is repeated stepwise until the intermediate target reaches the final target, that is, the reading characteristic Ir. The present calibration ends upon completion of automatic correction using the reading characteristic Ir as the final target.

Referring back to FIG. 3, the processing is described step by step in detail.

In step S301, a correction chart printed on one side is placed on the document plate 101 and read by the reading device A 110. In step S302, the correction chart is turned over, placed on the document plate 101, and read by the reading device B 111. Here, the correction chart is a gradation image printed on one side. Alternatively, the same correction chart may be printed on both sides. In this case, it is desirable to prevent printed areas on both sides from overlapping each other. In other words, it is preferable not to have a region where both the front and back sides are printed. Additionally, when the same correction chart is printed on both sides, it is necessary to consider the fact that the correction chart read by the reading device A 110 differs, in a strict sense, from that read by the reading device B 111.

A read image signal on the front side is gamma-corrected by the gamma corrector 1001 and color-processed by the color processor 1002. Thus, front-side read data 303 is generated.

Similarly, a read image signal on the back side is gamma-corrected by the gamma corrector 1003 and color-processed by the color processor 1004. Thus, back-side read data 304 is generated.

The front-side read data 303 and the back-side read data 304 are stored in the storage device 903 or RAM 904 (see reference numerals 312 and 313 in FIG. 3) for subsequent use in setting targets.

In step S305, the stored front-side read data 303 is set as an initial target. In step S306, a color processing table is corrected. Specifically, in step S306, color processing parameters in the color processing table in the color processor 1004 are adjusted such that a color of the back-side read data 304 matches the initial target (first color adjustment). The color of the back-side read data 304 does not have to exactly match the initial target, but has to be close to the initial target. The color processing parameters are, for example, grid points in the color processing table (3D-LUT).

In the process described above, a correction chart printed on both sides of a document is placed on the document plate 101, a scan button displayed on the setting UI 113 is pressed, and the document is read by the image reading apparatus. This is an operation normally performed in typical calibration. In the following process, since the calibration is performed inside the image reading apparatus using the read data, automatic correction can be made without manual intervention.

In the automatic correction of the present exemplary embodiment, an operation for controlling the amount of correction continues until an ideal state is eventually reached. In a typical operation for controlling the amount of correction, correction is not made by an amount exceeding a predetermined amount. Therefore, a series of calibration steps is repeated several times until the ideal state is reached. This means, in this case, that calibration which involves manual intervention needs to be performed many times.

In the automatic correction of step S307, when it is determined that correction timing is reached, the correction is performed by an amount which does not make the user feel uncomfortable. This correction is repeated multiple times in a stepwise manner. Specifically, in step S308, it is determined whether correction timing is reached. The correction timing is determined on the basis of information stored in the storage device 903 or RAM 904. Examples of the information include the time that has elapsed since the previous automatic correction, the number of scans that have been performed since the previous automatic correction, and the number of document sheets that have been scanned since the previous automatic correction (see reference numeral 314 in FIG. 3). For example, automatic correction is performed when a predetermined time has elapsed since the previous automatic correction, when a predetermined number of document scans have been performed since the previous automatic correction, or when a predetermined number of document sheets have been scanned since the previous automatic correction. Correction parameters are set such that corrections are not performed too frequently, or that a correction can be performed before a color shift between front and back sides becomes too large. Alternatively, any other correction parameters best suited for use in determination of timing may be used.

If it is determined in step S308 that timing for executing automatic correction is reached, an intermediate target is set in step S309. There are several possible methods for setting an intermediate target, some of which are described herein.

FIG. 4 illustrates a state of correction at one grid point in a LUT. A method for calculating an intermediate target will thus be described with reference to FIG. 4. One grid point in a color processing LUT used in the color processor 1002 or color processor 1004 has three parameters, RGB. However, for simplification, the number of the parameters is assumed to be one. The amount of each correction x is determined in advance, and the number of automatic corrections n is counted. Thus, the next intermediate target value can be determined from the front-side read data 303 (If), the back-side read data 304 (Ir), the amount of each correction x, and the number of automatic corrections n.

In a first method, an intermediate target value can be determined by calculating If−x×n, where the amount of correction x is a predetermined read value. In a second method, an intermediate target value can be determined by calculating If−(If−Ir)×x×n÷100, where the amount of correction x is a predetermined rate. For correction of a LUT, where the total amount of correction varies from one grid point to another, the second method will provide a better correction which is more comfortable for the user. A value determined as an intermediate target is compared with the back-side read data (Ir), which is a final target. If the value of Ir is exceeded, the intermediate target value is set to Ir. To make the user feel comfortable, the amount of correction x is set not to exceed a predetermined amount.

After an intermediate target for every grid point is set, each grid point (color processing parameter) in a color processing table used in the color processor 1002 and color processor 1004 is corrected in step S310. That is, in step S310, each color processing parameter is adjusted such that colors of both the front-side read data 303 set as the initial target and the back-side read data become closer to the color of the back-side read data 304 stored in the storage device 903 or RAM 904 (second color adjustment). The second and other automatic corrections that follow are performed such that the front-side read data and back-side read data previously automatically corrected become closer to the color of the back-side read data 304.

In step S311, it is determined whether intermediate target values for all the grid points match the final target value. If so, the process of automatic correction ends. If not, the process returns to step S307 and the above-described processing is repeated.

In the first exemplary embodiment described above, in calibration for the double-side simultaneous image reading apparatus, it is possible to match the reading characteristics of the front-side reading device and back-side reading device. Additionally, in the single-side reading mode, it is possible to perform calibration which does not make the user recognize a sudden change in reading characteristic before and after the calibration. Moreover, the reading characteristics of the front-side reading device and back-side reading device are eventually brought close to an ideal reading characteristic which is not significantly different from the level of the original document. Thus, high-accuracy calibration can be performed without placing any burden on the user.

Hereinafter, image processing according to a second exemplary embodiment of the present invention will be described. In the second exemplary embodiment, components equivalent to those of the first exemplary embodiment are given the same reference numerals and a detailed description thereof will not be repeated.

The second exemplary embodiment differs from the first exemplary embodiment only in terms of the method for setting an initial target. In the first exemplary embodiment, data read from the front side is used as an initial target without change. However, special considerations need to be made in calibration if the degree of degradation of the scanner or a difference in the degree of degradation between the front and back sides is too large.

Figure 5:
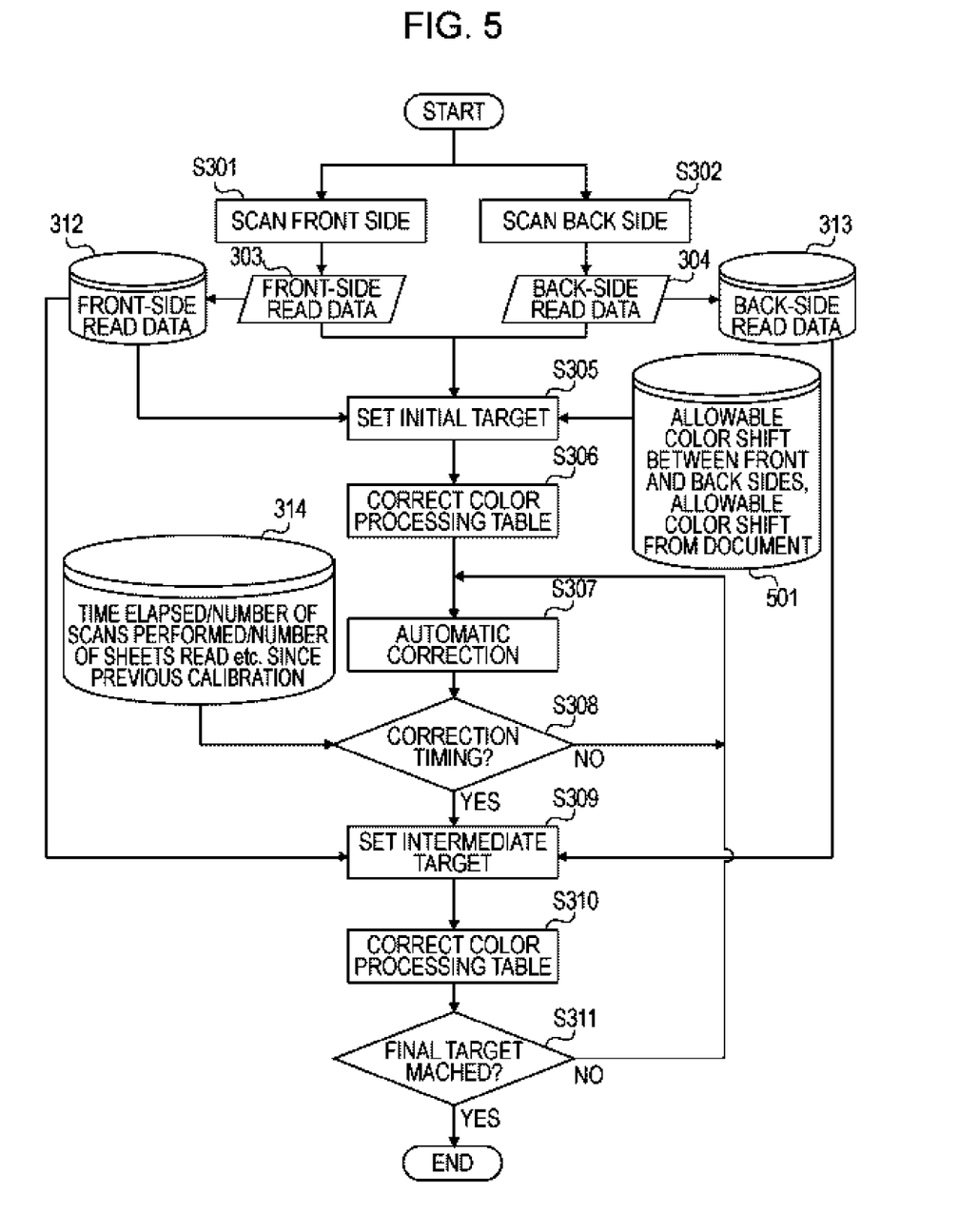
FIG. 5 is a flowchart illustrating a process of calibration according to an exemplary embodiment of the present invention.

FIG. 5 illustrates a flow of calibration according to the second exemplary embodiment. In step S305, an initial target is set with reference to a predetermined allowable range 501 of color shift. For example, specification values for shipment of the product may be used as the allowable range 501.

A method for setting an initial target will be described step by step with reference to FIG. 6A to FIG. 6C.

Figure 6A:
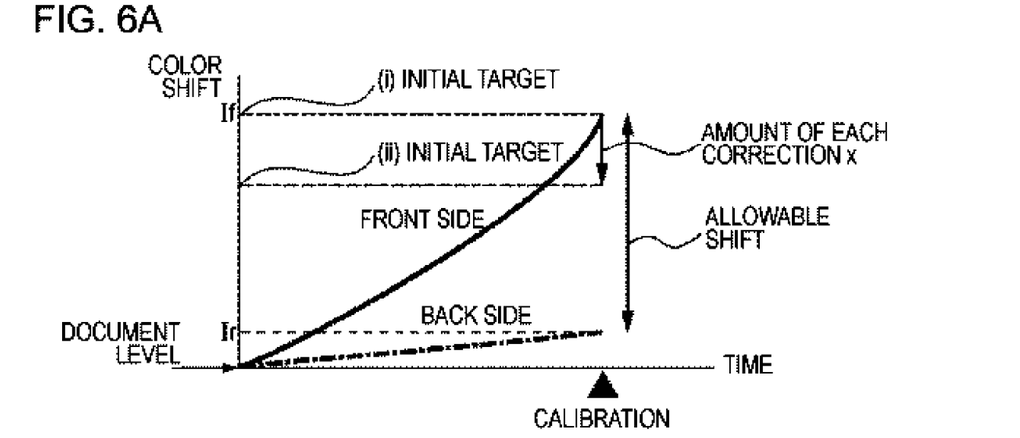
FIG. 6A to FIG. 6C illustrate a method for setting an initial target.

FIG. 6A illustrates the case where a difference between the front and back sides in calibration is within an allowable range. Specifically, (i) corresponds to the setting method of the first exemplary embodiment, while (ii) corresponds to a setting method in which a value brought closer to the final target by an amount of one correction x is used as an initial target. The amount of one correction x is defined to be an amount that does not make the user feel uncomfortable. Therefore, use of the setting method corresponding to (ii) makes it possible to reach an ideal state more quickly.

Figure 6B:
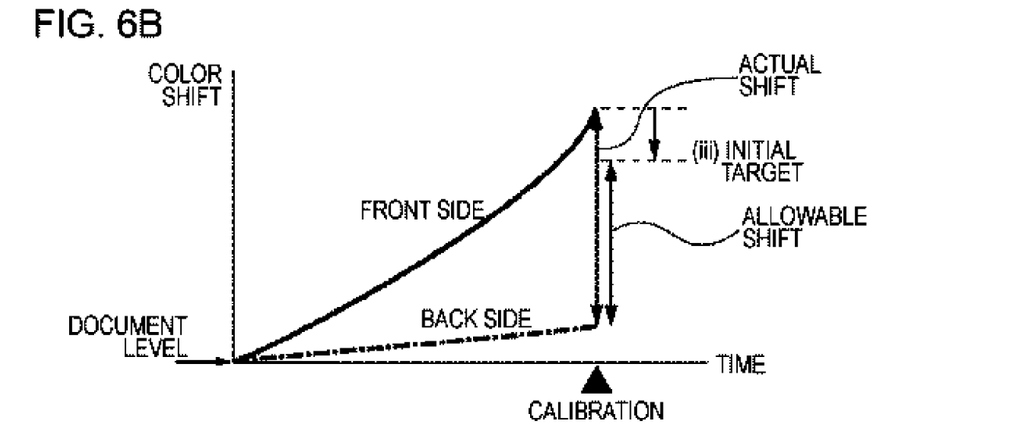

FIG. 6B illustrates the case where a color shift between the front and back sides is originally beyond an allowable range. It is not desirable in this case that the front-side read data be set as an initial target. Therefore, the upper limit of the allowable range from the back side is set as an initial target as indicated by (iii).

Figure 6C:
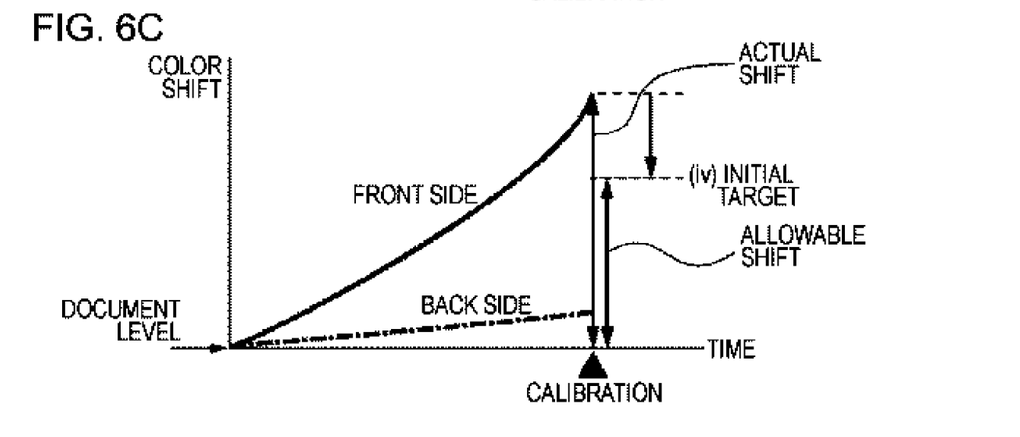

FIG. 6C illustrates the case where a value of the original document is known. If a color shift between the document and a deteriorated front side is beyond an allowable range, the upper limit of the allowable range from the document level is set as an initial target as indicated by (iv).

In the second exemplary embodiment, it is possible to prevent a reading characteristic of the back-side reading device from unnecessarily deteriorating.

Hereinafter, image processing according to a third exemplary embodiment of the present invention will be described.

In the third exemplary embodiment, timing of starting calibration is controlled. After calibration starts, automatic correction continues for a certain period of time. If, without knowing it, the user tries to start another calibration, a problem occurs. A detailed description will be made with reference to FIG. 7.

Figure 7:
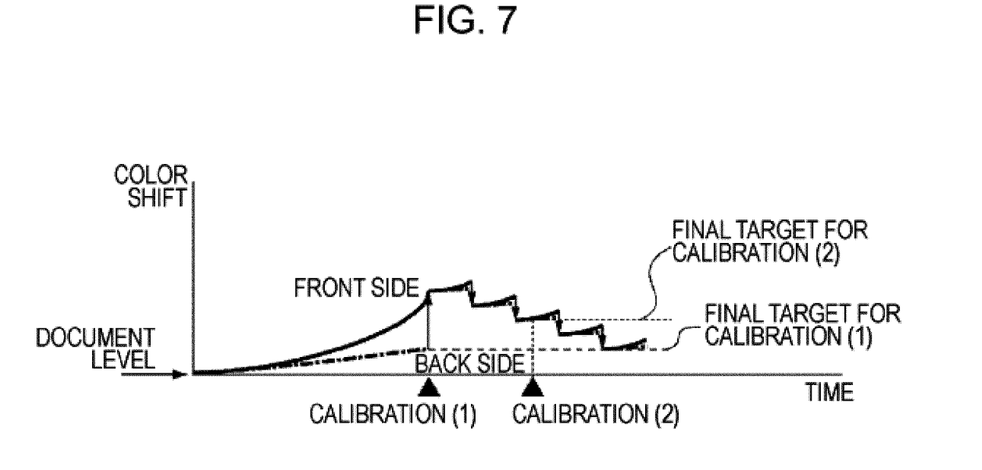
FIG. 7 illustrates another embodiment of the present invention.

FIG. 7 illustrates the degree of degradation of the reading characteristics of the front-side reading device and back-side reading device. The horizontal axis represents time and the vertical axis represents a color shift from a document level. A calibration (1) starts when a difference in reading characteristic between the front and back sides widens. A final target for the calibration (1) is stored in the back-side read data 313. The reading characteristic of the back-side reading device is adjusted to that of the front-side reading device. Then, automatic correction brings the reading characteristics of the front-side reading device and back-side reading device closer to the final target. If a calibration (2) starts before completion of the automatic correction, the reading characteristic of the back-side reading device at this point is written, as a final target, over the back-side read data 304. Thus, the result of the calibration (2) is worse than that expected in the calibration (1).

To solve this, a method based on the third exemplary embodiment performs control such that even if a calibration request is input during calibration previously started, the requested calibration is not executed. That is, control is performed such that if an intermediate target value does not match a final target, the calibration request is not accepted.

In the third exemplary embodiment, a new calibration can be prevented from starting during execution of automatic correction. It is thus possible to prevent a final target from deviating from an ideal target.

Hereinafter, image processing according to a fourth exemplary embodiment of the present invention will be described. In the fourth exemplary embodiment, components equivalent to those of the first exemplary embodiment are given the same reference numerals and a detailed description thereof will not be repeated.

The fourth exemplary embodiment differs from the first exemplary embodiment only in terms of the method for setting an intermediate target. The first exemplary embodiment describes the method of setting an intermediate target using the front-side read data 303 and back-side read data 304. In the fourth exemplary embodiment, target data for the previous calibration is stored for use in calculating a new intermediate target.

Figure 8:
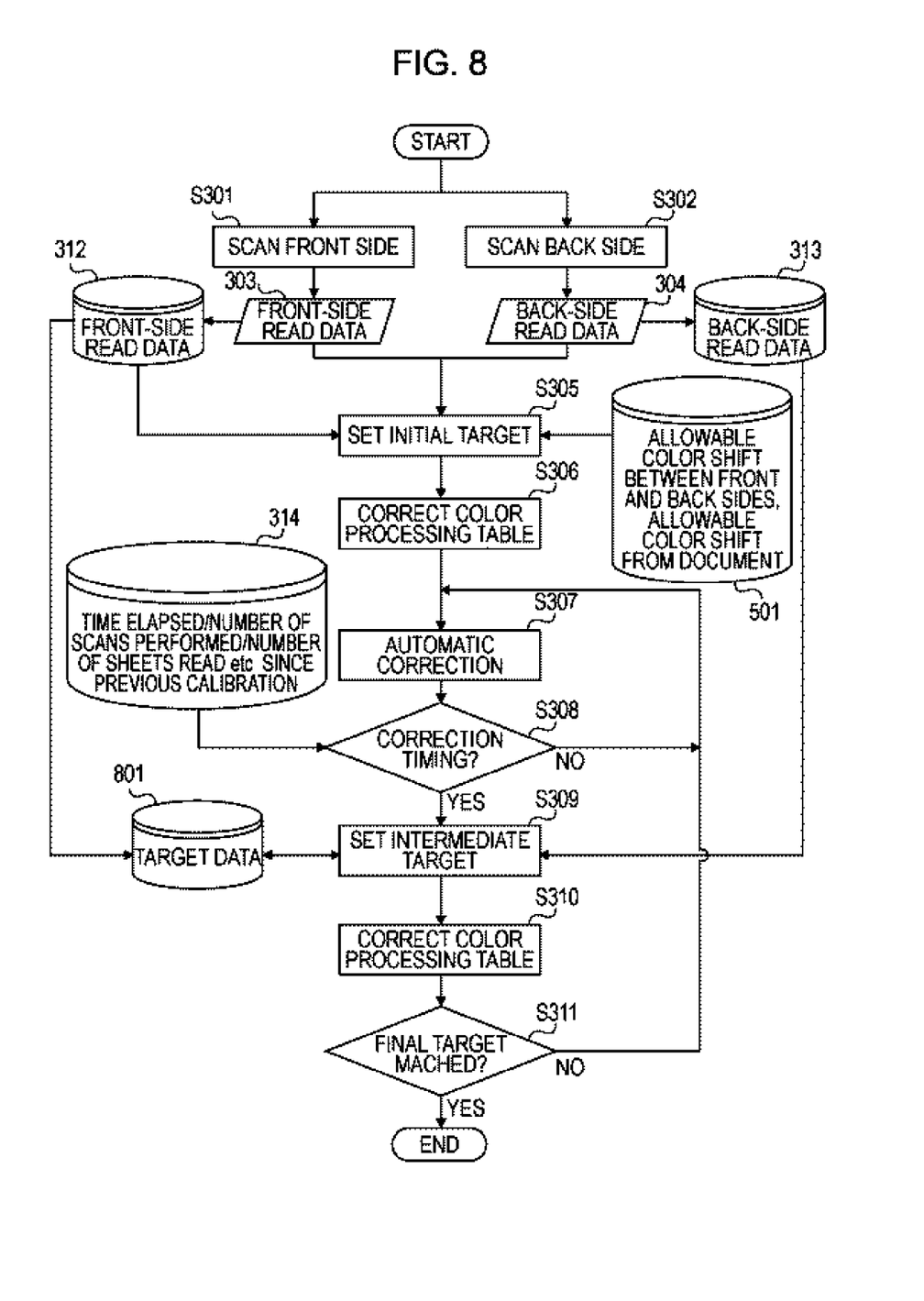
FIG. 8 is a flowchart illustrating a process of calibration according to an exemplary embodiment of the present invention.

FIG. 8 is a flowchart illustrating a process of calibration of the fourth exemplary embodiment.

An initial target set in step S305 is stored in target data 801. For setting an intermediate target in step S309, data stored in the target data 801, the back-side read data 304, and the predetermined amount of each correction are used to calculate intermediate target data. Existing data in the target data 801 is updated with the intermediate target data newly set.

In the fourth exemplary embodiment, an intermediate target can be set with fewer calculations than in the case where it is calculated from the front-side read data 303 and back-side read data 304.

Hereinafter, image processing according to a fifth exemplary embodiment of the present invention will be described. In the fifth exemplary embodiment, components equivalent to those of the first exemplary embodiment are given the same reference numerals and a detailed description thereof will not be repeated.

A method for controlling automatic correction will be described here. When, in step S311 of FIG. 3, intermediate target values for all grid points match a final target value, an automatic correction ends. However, this method always involves a comparison between an intermediate target value and a final target value. This may adversely affect the efficiency depending on the method for calculating an intermediate target or the total amount of correction at the grid point. Thus, the number of necessary corrections may be calculated in advance and the correction may be performed until the determined number of corrections is reached. The number of corrections may be calculated by the following methods. In one method, a grid point at which the amount of correction is the largest is detected on the basis of the front-side read data 303 and back-side read data 304. Then, the number of corrections necessary when the detected grid point is corrected by a predetermined amount (or at a predetermined rate) is calculated. In another method, a grid point at which the amount of correction is the smallest is detected, the minimum number of corrections necessary is calculated, and then grid points remaining uncorrected are checked.

There are other methods for setting conditions for ending the control of automatic correction. That is, control may be performed in any manner as long as automatic correction ends when an intermediate target value for every grid point eventually matches the final target value.

In the fifth exemplary embodiment, the number of calculations for comparing an intermediate target value with a final target value can be reduced, and the calculation load can thus be reduced.

The present invention may be applied either to a system constituted by a plurality of devices (e.g., host computer, interface device, reader, and printer) or an apparatus (e.g., copier or facsimile apparatus) constituted by a single device.

The present invention can be provided when a computer-readable recording medium in which software program code for realizing the functions of the above-described exemplary embodiments is recorded is supplied to a system or an apparatus, and a computer (or a CPU or microprocessing unit (MPU)) of the system or apparatus reads and executes the program code stored in the recording medium.

In this case, the program code read out of the computer-readable recording medium realizes the functions of the above-described exemplary embodiments. Therefore, the recording medium storing the program code constitutes the present invention.

Examples of the recording medium for supplying the program code include a floppy disk, a hard disk, an optical disk, a magneto-optical disk, a compact-disk read-only memory (CD-ROM), a CD-recordable (CD-R), a magnetic tape, a non-volatile memory card, and a ROM.

As described above, the functions of the above-described exemplary embodiments are realized by executing the program code read out by the computer. Additionally, in accordance with an instruction of the program code, an operating system (OS) or the like running on the computer may perform all or a part of the actual processing, so that the functions of the above-described exemplary embodiments are realized by this processing.

Furthermore, after the program code is read out of the recording medium, it can be written to a function expansion board inserted in the computer or to a memory provided in a function expansion unit connected to the computer. A CPU or the like mounted on the function expansion board or function expansion unit may perform all or a part of the actual processing, so that the functions of the above-described exemplary embodiments are realized by this processing.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-328731 filed Dec. 20, 2007, which is hereby incorporated by reference herein in its entirety.

What is claimed is:

1. An image reading apparatus for reading images on both sides of a document, the image reading apparatus comprising:
a first reading unit configured to read an image on a front side of the document;
a second reading unit configured to read an image on a back side of the document;
a first color processing unit configured to perform color processing on the image read by the first reading unit;
a second color processing unit configured to perform color processing on the image read by the second reading unit;
a first color adjusting unit configured to set a color of the image on the front side of the document color-processed by the first color processing unit as an initial target and adjust a color processing parameter used in the second color processing unit such that a color of the image on the back side of the document color-processed by the second color processing unit becomes the same as the initial target; and
a second color adjusting unit configured to set the color of the image on the back side of the document color-processed by the second color processing unit as a second target and adjust, in multiple steps, a color processing parameter used in the first color processing unit and the color processing parameter used in the second color processing unit such that both the color of the image on the front side of the document color-processed by the first color processing unit and the color of the image on the back side of the document color-processed by the second color processing unit using the color processing parameter color-adjusted by the first color adjusting unit become closer stepwise to the second target,
wherein if a difference between the color of the image color-processed by the first color processing unit and the color of the image color-processed by the second color processing unit exceeds an allowable range, the initial target is set between the color of the image color-processed by the first color processing unit and the color of the image color-processed by the second color processing unit.

2. The image reading apparatus according to claim 1, wherein, in the second color adjusting unit, the color processing parameter used in the first color processing unit and the color processing parameter used in the second color processing unit are corrected by an amount not exceeding a predetermined amount in each color adjustment.

3. The image reading apparatus according to claim 1, wherein the second color adjusting unit adjusts the color processing parameter used in the first color processing unit and the color processing parameter used in the second color processing unit after a predetermined period of time has elapsed since the previous adjustment of the color processing parameters.

4. The image reading apparatus according to claim 1, wherein the second color adjusting unit adjusts the color processing parameter used in the first color processing unit and the color processing parameter used in the second color processing unit after a document reading operation has been performed a predetermined number of times since the previous adjustment of the color processing parameters.

5. The image reading apparatus according to claim 1, wherein the second color adjusting unit adjusts the color processing parameter used in the first color processing unit and the color processing parameter used in the second color processing unit after a predetermined number of documents have been read since the previous adjustment of the color processing parameters.

6. An image reading method for reading images on both sides of a document, the image reading method comprising:
a first reading step of reading an image on a front side of the document;
a second reading step of reading an image on a back side of the document;
a first color processing step of performing color processing on the image read in the first reading step;
a second color processing step of performing color processing on the image read in the second reading step;
a first color adjusting step of setting a color of the image on the front side of the document color-processed in the first color processing step as an initial target and adjusting a color processing parameter used in the second color processing step such that a color of the image on the back side of the document color-processed in the second color processing step becomes the same as the initial target; and
a second color adjusting step of setting the color of the image on the back side of the document color-processed by the second color processing step as a second target and adjusting, in multiple steps, a color processing parameter used in the first color processing step and the color processing parameter used in the second color processing step such that both the color of the image on the front side of the document color-processed in the first color processing step and the color of the image on the back side of the document color-processed by the second color processing step using the color processing parameter color-adjusted in the first color adjusting step become closer stepwise to the second target,
wherein if a difference between the color of the image color-processed in the first color processing step and the color of the image color-processed in the second color processing step exceeds an allowable range, the initial target is set between the color of the image color-processed by the first color processing step and the color of the image color-processed by the second color processing step.

7. The image reading method according to claim 6, wherein, in the second color adjusting step, the color processing parameter used in the first color processing step and the color processing parameter used in the second color processing step are corrected by an amount not exceeding a predetermined amount in each color adjustment.

8. The image reading method according to claim 6, wherein the second color adjusting step adjusts the color processing parameter used in the first color processing step and the color processing parameter used in the second color processing step after a predetermined period of time has elapsed since the previous adjustment of the color processing parameters.

9. The image reading method according to claim 6, wherein the second color adjusting step adjusts the color processing parameter used in the first color processing step and the color processing parameter used in the second color processing step after a document reading operation has been performed a predetermined number of times since the previous adjustment of the color processing parameters.

10. The image reading method according to claim 6, wherein the second color adjusting step adjusts the color processing parameter used in the first color processing step and the color processing parameter used in the second color processing step after a predetermined number of documents have been read since the previous adjustment of the color processing parameters.

11. A non-transitory computer readable storage medium storing a program causing a computer to execute an image reading method in an image reading apparatus, the image reading method comprising:

a first reading step of reading an image on a front side of a document;

a second reading step of reading an image on a back side of the document;

a first color processing step of performing color processing on the image read in the first reading step;

a second color processing step of performing color processing on the image read in the second reading step;

a first color adjusting step of setting a color of the image on the front side of the document color-processed in the first color processing step as an initial target and adjusting a color processing parameter used in the second color processing step such that a color of the image on the back side of the document color-processed in the second color processing step becomes the same as the initial target; and a second color adjusting step of setting the color of the image on the back side of the document color-processed by the second color processing step as a second target and adjusting, in multiple steps, a color processing parameter used in the first color processing step and the color processing parameter used in the second color processing step such that both the color of the image on the front side of the document color-processed in the first color processing step and the color of the image on the back side of the document color-processed by the second color processing step using the color processing parameter color-adjusted in the first color adjusting step become closer stepwise to the second target, wherein if a difference between the color of the image color-processed in the first color processing step and the color of the image color-processed in the second color processing step exceeds an allowable range, the initial target is set between the color of the image color-processed by the first color processing step and the color of the image color-processed by the second color processing step.

\* \* \* \* \*